United States Patent [19]

Almqvist et al.

[11] 4,205,031

[45] May 27, 1980

[54] METHOD OF PRODUCING LAMINATES OF REINFORCED OR NON-REINFORCED THERMOSETTING RESIN IN A LOW PRESSURE CHAMBER

[76] Inventors: Kent R. Almqvist, Box 5159, S-43400 Kungsbacka; Jan A. Christensen, Vallhamnsgatan 106, S-42166 Västra Frölunda, both of Sweden; Roar L. Alfheim, Idunsvei 12, N-3200 Sandefjord; Lars Torgersen, Storängsveien 62 B, N-1320 Stabekk, both of Norway

[21] Appl. No.: 802,875

[22] Filed: Jun. 2, 1977

[30] Foreign Application Priority Data

Jun. 10, 1976 [SE] Sweden .............................. 7606540

[51] Int. Cl.² .......................................... B29D 9/04
[52] U.S. Cl. .................................... 264/40.4; 264/102; 264/255; 264/309; 264/510; 264/571; 425/210
[58] Field of Search .............. 264/101, 102, 255, 90, 264/DIG. 78, 40.1, 40.4, 510, 571, 309; 425/73, 210

[56] References Cited

U.S. PATENT DOCUMENTS

| Re. 14,603 | 3/1919 | Roberts | 264/101 X |
|---|---|---|---|
| 2,165,671 | 7/1939 | Ward | 264/101 X |
| 3,413,392 | 11/1968 | Meadows | 264/102 |
| 3,663,148 | 5/1972 | Walker | 264/102 X |
| 3,664,786 | 5/1972 | Devine | 264/101 X |

FOREIGN PATENT DOCUMENTS

1162999 2/1964 Fed. Rep. of Germany ........... 264/102

*Primary Examiner*—Thomas P. Pavelko
*Attorney, Agent, or Firm*—Harness, Dickey & Pierce

[57] ABSTRACT

A method of producing laminar structures, preferably consisting of fibreglass-reinforced polyester, which are free of air-pockets and pores, by spraying layers of the plastics and reinforcement fibres at a partial vacuum. The method may be carried out by an industrial robot. An airtight surface layer may be sprayed onto the laminate, whereby any pores or air-pockets collapse when the laminate is exposed to air at atmospheric pressure.

6 Claims, 4 Drawing Figures

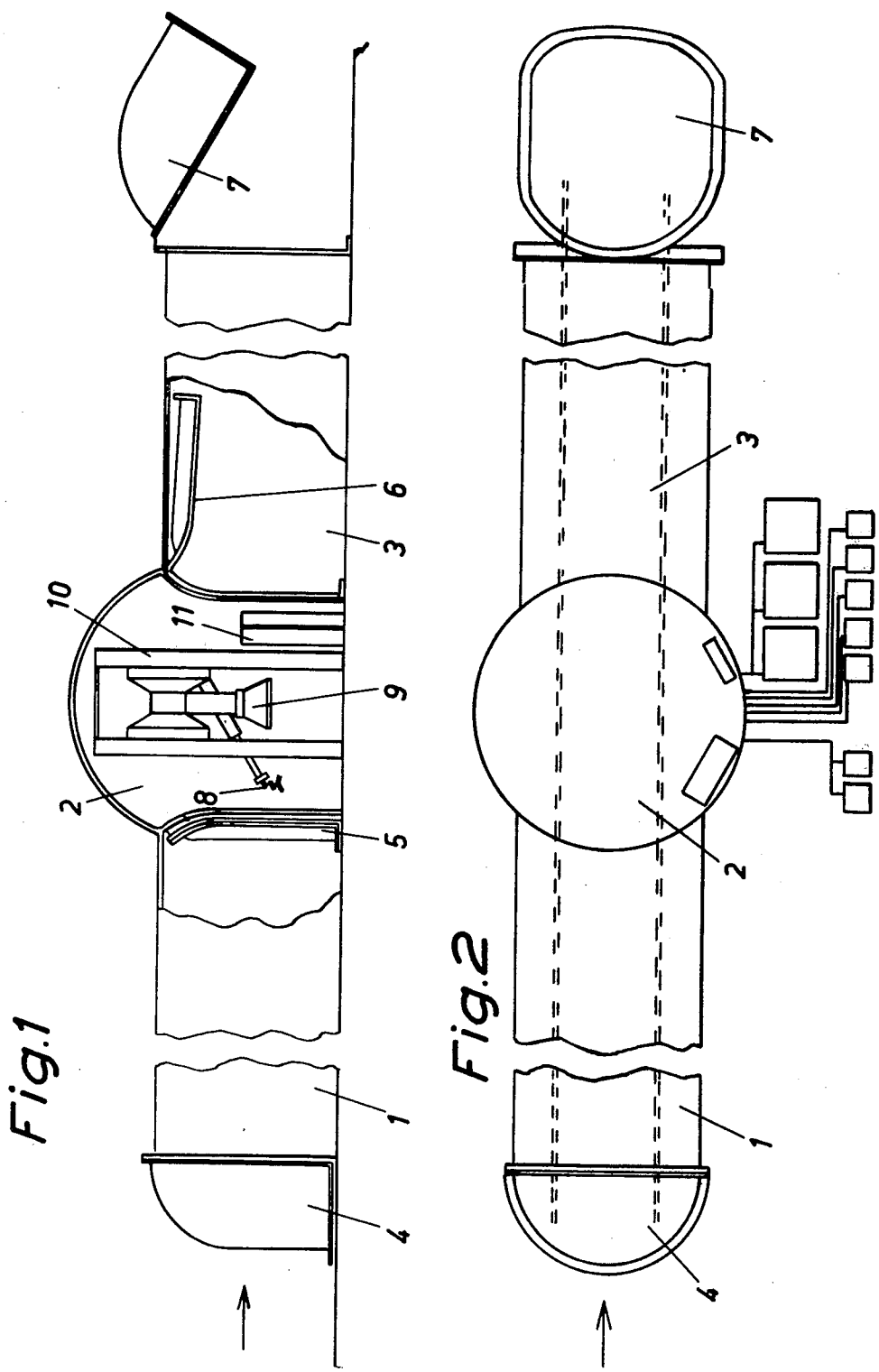

METHOD OF PRODUCING LAMINATES OF REINFORCED OR NON-REINFORCED THERMOSETTING RESIN IN A LOW PRESSURE CHAMBER

BACKGROUND OF THE INVENTION

The subject invention concerns a method of manufacturing reinforced as well as non-reinforced thermosetting resin products, preferably products of glass-fibre-reinforced polyester, by building up a laminate of layers of synthetic resin and reinforcement fibres, if such fibres are used, with the aid of spraying equipment, by spraying the synthetic resin and the reinforcement fibres, if any, onto the wall of a mould.

Laminates comprising polyester and glass-fibre are to-day produced by means of spray-application at atmospheric pressure. The method in accordance with the subject invention is based on controlled spraying or application at a partial vacuum, preferably with the aid of industrial robots.

One problem inherent in spray application processes carried out in environmental atmosphere is that considerable amounts of air are mixed into the laminate. As a result, lengthy and manual working operations are required to make the laminate more homogenous. Despite such working, large amounts of air still remain in laminates produced in accordance with the methods hitherto used, which is the immediate cause of penetration of moisture into the laminate and weakening of the chemical and mechanical strength thereof.

This is also to a great extent true in spray-application of so-called gel coat, in which case it is likewise of importance that this external coating is free of air and pores to prevent the above-mentioned moisture penetration and degradation.

The method hitherto used which includes rolling to achieve the homogenous character, i.e. to squeeze the air out of the laminate, is very time-consuming and inefficient. The resulting products are uneven and therefore often have poor competitive ability in comparison with products of wood and metal.

In the present method of treating laminates with the aid of a metal roller for homogenization purposes, the fibreglass is exposed to mechanical stress which bends or breaks the fibres. As a result, the mechanical strength of the finished laminate is reduced. In addition, there is a marked tendency that the fibre, when exposed to hard and intensive rolling, will migrate to the lower portion of the laminate while the upper portion thereof, including approximately 20 to 25% of the thickness of the laminate, will be very rich in polyester, i.e. will have lower fibreglass contents. This is not desirable, as the mechanical qualities of the surface layer thus are reduced.

In order to reduce these time-consuming rolling operations, there is a great deal of negligence in industry. For instance, in many cases layers of a thickness of between 3 and 4 millimeters are applied between each rolling (1 to 2 millimeters is actually recommended).

On account of air resistance and re-circulation of air from the mould, the glassfibres easily rise when the prior-art method is used. The result is an increase of the partial lamination effect, giving less tensile and bending strength, a problem which most manufacturers have difficulties in solving when using to-day's operational methods.

Because of the phenomenon outlined above concerning re-circulation of air, it is impossible to spray complex-shaped objects, such as narrow areas and keel structures, with the aid of hitherto conventional methods, both in the case of gel coat and fibreglass/polyester. In such cases, the gel coat must be applied manually and the laminates be laminated by hand. This means prolonged working times and increased costs.

SUMMARY OF THE INVENTION

As mentioned before, spraying of polyester/fibreglass with our without the assistance of industrial robots without making use of partial vacuum involves considerable disadvantages and reduces the capacity. These disadvantages are eliminated by the subject invention which concerns a method which is characterised in that the method is performed in a chamber which is maintained at a partial vacuum and in which is enclosed the entire equipment for performing the method.

The novel and particular feature of the invention thus resides in that the spraying is carried out in a controlled manner at a partial vacuum, if desired with the aid of a fully automated robot, which in comparison with operational methods hitherto used gives a reduction of the production time to approximately 10–25% of the time required when using hitherto common operational methods.

The operational gains which provide for improved economy, also give the following additional advantages:

(a) The laminate consisting of polyester and fibreglass is more competitive in fields where for price reasons this material has not hitherto been able to compete.

(b) Improvements in quality of the laminate obtained, as a consequence of the invention, bring about improved mechanical properties and improved resistance to water absorption. When the laminar structure is built up with the aid of robots or by controlled spraying at a partial vacuum, the resulting laminates become satisfactorily free of air and pores. This diminishes for instance the costs of subsequent adjustment operations hitherto required.

(c) All manual work is eliminated, as the entire process may be carried out by automated means in sealed off production chambers at a partial vacuum (up to 95%).

(d) From an environmental point of view, the method is most advantageous, as the workers need not come in contact with the productive unit, where the laminate is being built up. It becomes easier to improve the external environment on account of the higher concentration of styrene in the discharge, which improves the economical conditions for cleaning of the discharge.

(e) The casting capacity per mould is increased by the invention by appr. 75–150% because the homogenization operation becomes redundant. The method is furthermore independent on gelling times. This means that the curing may be initiated immediately after the application of the material on the mould.

(f) Because the number of moulds in use may be reduced as a result of the shorter time of application, the manufacturer's expenses for moulds are reduced, in addition to which the space savings are considerable. In practice, a laminate producing enterprise could reduce its present space requirements by appr. 50%, alternatively increase their production correspondingly in the same flooring space.

(g) The spray method technique of the invention may be used for all known curvatures and indentations, such as e.g. for deep keel structures for boats.

(h) All laminates may be made as good as identical, with the result that the laminate thickness will be more even. Hitherto, laminates produced by conventional working methods vary considerably. The number of complaints and rejections is reduced as a result of the possibility to produce more even laminates.

Further characteristics of the invention will become apparent from the claims.

BRIEF DESCRIPTION OF THE DRAWINGS

The invention will be described in more detail in the following with reference to the accompanying drawings, wherein FIG. 1 is a partly broken lateral view of an application device for performing the method in accordance with the invention, FIG. 2 illustrates a corresponding plane view.

DETAILED DESCRIPTION OF A PREFERRED EMBODIMENT

Figure 3:
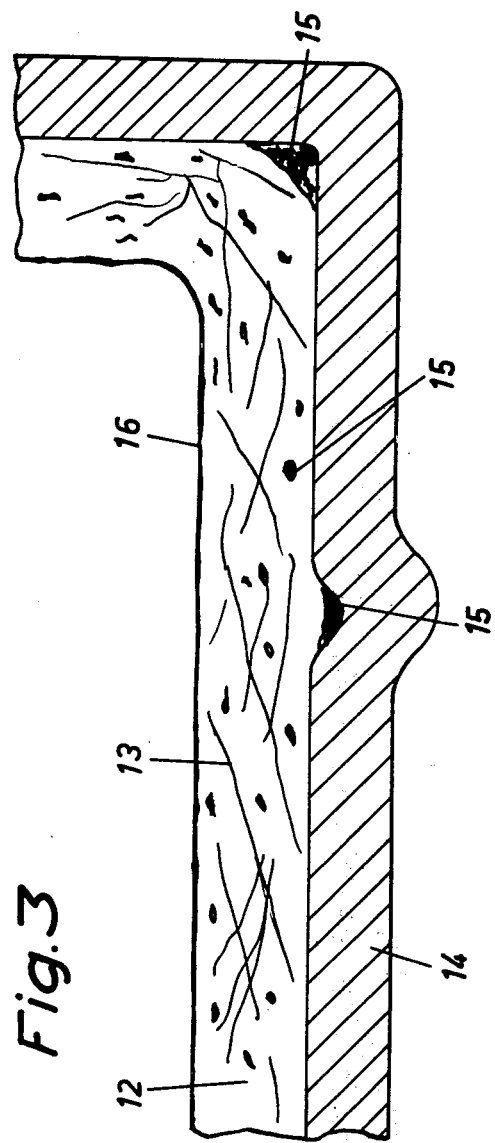
FIG. 3 is a cross-sectional view of a fibreglass reinforced polyester laminate in a mould prior to being exposed to atmospheric pressure.

The plant illustrated in FIG. 1 consists of three, mutually separated chambers 1, 2, 3 which are interconnected through locks 4, 5, 6, 7. The chambers 1, 2, 3 are in operation brought to a partial vacuum of up to 95%. The chambers are dimensioned to withstand the stresses of the partial vacuum.

The application takes place in the middle chamber 2, wherein a spraying device 8, if desired provided with an industrial robot 9 (if desired mounted on an overhead crane 10) is positioned. The locks 4–7 of the chambers 1–3 are opened and closed, when the pressure are equal on either side of the locks 4–7. An access port 11 is provided in the middle chamber 2 to make it possible to cure any productional breakdowns.

The robot 9 in the middle chamber 2 is of the type used to-day e.g. for advanced paint spraying operations. However, it may be equipped to perform six movements instead of the conventional five.

The robot 9 is mounted on a vertically and horizontally movable overhead crane 10. All the movements of the overhead crane 10 are fed into the computer unit of the robot 9 and are synchronized with the movements of the robot 9. As a result, a fully automated robot 9 performing nine movements, is obtained. This construction provides a 30% increase of the possible movements over any other known system and thus covers all possible curvatures and working operations.

Mounted on the robot 9 is the polyester and fibreglass spraying equipment 8. This equipment 8 consists of a machine capable of applying one or two components, glassfibre and polyester, and comprising a cutter means and a gel coat application machine.

In accordance with one aspect of the method in accordance with the invention all material components are required to be maintained at a partial vacuum during the operation.

The entire raw material consumption is checked and corrected during the operation with the aid of the computer unit of the robot 9.

To avoid production break-downs as a consequence of fibreglass breaks, two fibreglass cutting means are mounted on the spray gun 8, one of them being a spare.

To check the production visually, two TV supervising units are provided, one for detail supervision of the spraying operation and one for overall supervision.

The moulds, which are provided with wheels, are forcibly guided onto three separate rail units which are independent on the locks 4–7. The moulds are conveyed with the aid of hydraulic cylinders, one in each one of chambers 1–3. Inside the middle chamber 2, the mould is stopped in response to an impulse signal to be carefully adjusted relative to the robot 9.

The production begins by a prepared mould being positioned inside the entrance low pressure chamber 1, whereupon the lock 4 is closed and the chamber 1 evacuated to a partial vacuum.

Because the centre chamber 2 is to be maintained continually at a partial vacuum, the sluice lock 5 intermediate the entrance low pressure chamber 1 and the robot station, i.e. the centre chamber 2, may be opened. The moulds are then conveyed automatically and the spraying operation is begun. Before a mould reaches the exit lock 6, the discharge chamber 3 is evacuated to a partial vacuum, whereupon the lock 6 between the centre chamber 2 and the exit chamber 3 is opened and the mould transferred to the latter chamber 3. The lock 6 is then closed and air at atmospheric pressure is introduced thereinto. The lock 7 is opened and the mould with the laminate is removed therefrom for further treatment.

During the latter part of the production programme, the subsequent cycle is started.

The method of building up a laminar structure of fibreglass/polyester is the following:

When, as illustrated in FIG. 3, polyester 12 and fibreglass 13 are applied on a mould 14 at a partial vacuum, small pores 15 at a partial vacuum of 90% are trapped in the laminate. When using prior-art methods, these pores contain air at ordinary atmospheric pressure.

Figure 4:
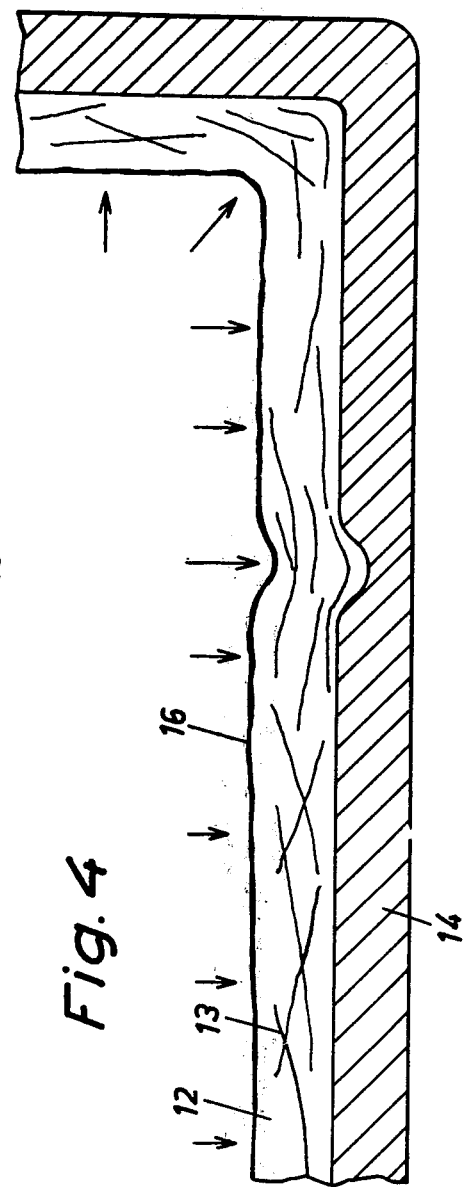
FIG. 4 is a view of the same laminate after having been exposed to atmospheric pressure.

When the desired laminate thickness has been obtained, a preferably air-tight finishing layer 16 is sprayed on. This layer makes any topcoats superfluous, as it becomes completely non-sticky after curing. The purpose of this layer is to prevent air from penetrating into the laminate, when the air is let in (indicated in arrows in FIG. 4) into the low pressure chamber 3. The bubbles which are at a partial vacuum in the laminate, are then compressed entirely, whereby a satisfactorily air-free laminate is obtained, as illustrated in FIG. 4.

The invention is not limited to the embodiment as illustrated and described, as many modifications are possible and open to the expert within the scope of the appended claims.

What we claim is:

1. An improved method of manufacturing thermoset products such as products of fiberglass-reinforced polyester, by building up a laminate layer by spraying resin onto the wall of a mould with the use of spraying equipment, comprising the steps of positioning the mould in a chamber for performing said method in the chamber, maintaining said chamber at a partial vacuum, spraying the resin on the mould in the chamber while the partial vacuum is maintained, the entire equipment for performing said method enclosed inside chamber, spraying an airtight surface layer onto said laminate to prevent penetration of air, and subsequently exposing the mold, laminate and surface layer to atmospheric pressure for collapsing any pores and bubbles formed in said laminate during the process immediately upon exposure of said laminate to air at atmospheric pressure following said laminate build-up.

2. The improved method according to claim 1, comprising controlling said spraying equipment by means of a computer-operated robot, said robot mounted on an overhead crane.

3. The improved method according to claim 1, comprising effecting the build-up of said laminate by manual control of the spraying equipment.

4. The improved method according to claim 1, comprising the further step of feeding said mould into said low pressure chamber via an inlet lock chamber.

5. The improved method according to claim 1, comprising the further step of removing said mould from said low pressure chamber via an outlet lock chamber.

6. The improved method according to claim 1, comprising operating inside said chamber at a partial vacuum at least as low as 90%.

* * * * *